March 9, 1954  E. A. MEYER  2,671,254
ADJUSTABLE SPRING CLIP FOR MOLDING STRIPS
Filed Nov. 2, 1949
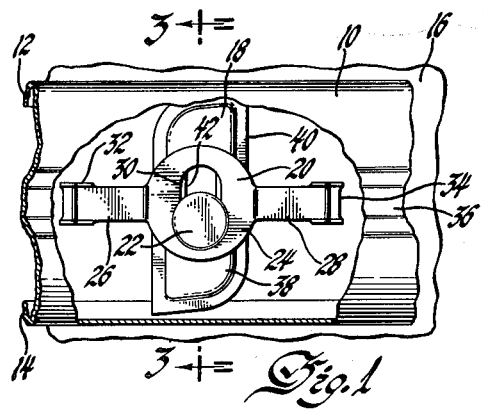
Fig. 1
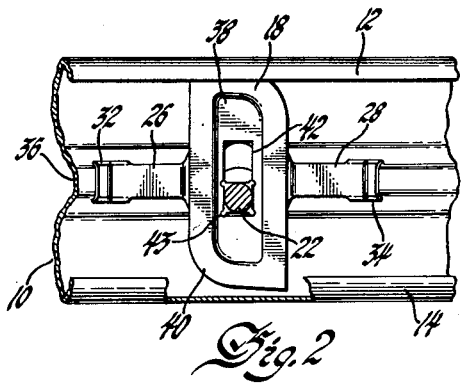
Fig. 2
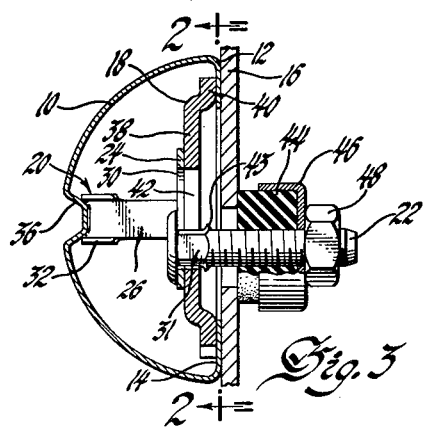
Fig. 3
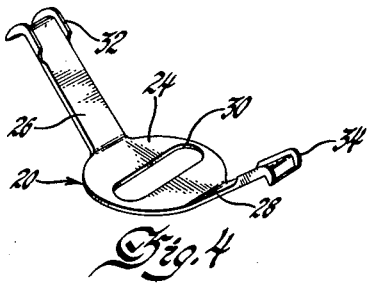
Fig. 4
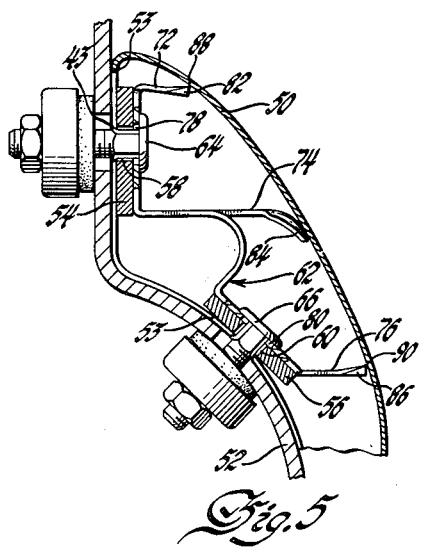
Fig. 5
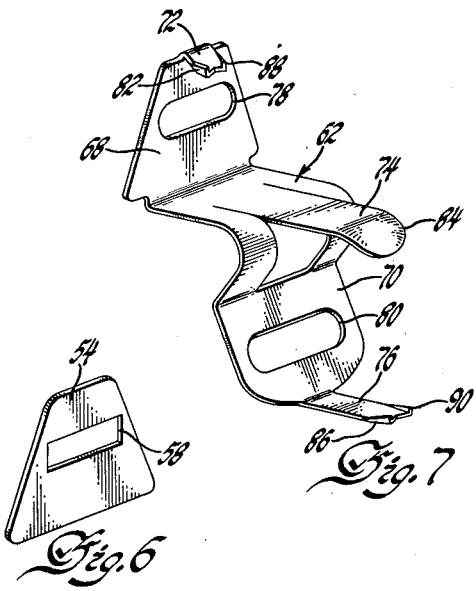
Fig. 6
Fig. 7
Inventor
Engelbert A. Meyer
By Willits, Helwig & Baillio
Attorneys Patented Mar. 9, 1954

2,671,254

UNITED STATES PATENT OFFICE 2,671,254

ADJUSTABLE SPRING CLIP FOR MOLDING STRIPS

Engelbert A. Meyer, Detroit, Mich., assignor to General Motors Corporation, Detroit, Mich., a corporation of Delaware Application November 2, 1949, Serial No. 125,050

4 Claims. (Cl. 24—73)

This invention relates to molding clips and particularly to an improved means for securing finished objects to supporting surfaces, such as the securing of a molding to the body of an automobile.

Features of the invention include the fact that the same clip may be used throughout the length of a tapered molding or in moldings of various sizes, at the same time permitting the ready attachment of the molding to a surface containing misaligned or imperfectly spaced apertures through which a portion of the clip must be introduced. This is possible because the invention provides clip adjustability, both parallel with and transverse to the molding. The clip comprises two primary members excluding the bolt assembly. These are an anchoring plate and a retainer spring, which are so designed with openings or slots to permit the aforementioned adjustability. The bolt assembly includes a carriage bolt constructed and arranged so as to fasten the anchoring plate and the retainer spring together and at the same time to permit these members, through the use of the aforementioned openings or slots, to slide or rotate with relation to each other or with relation to the carriage bolt. Moreover, although the clip is longitudinally and laterally adjustable, the retainer spring firmly maintains it in any selected position during the attachment of the molding.

The principal object of the invention is to design a molding retaining clip which is so constructed as to satisfy conditions demanding the above-mentioned flexibility. A further object of the invention is to provide a fastening device which is resiliently held in a hollow molding by spring arms to accommodate variations in both the molding height or thickness and molding width, thereby facilitating fastening of the molding and clip to the supporting surface or surfaces. Still another object of the invention is to provide a fastening device which effectively secures a longitudinally curved molding to one or more supporting surfaces, or one in which the flanged surface breaks sharply into another plane, such as is the case in corner fittings.

Other objects and advantages of the invention will more fully appear from the following description taken in connection with the accompanying drawing in which:

Figure 1 is a plan view, partly broken away, of a molding or trim strip and a preferred embodiment of the molding clip, a portion of the molding face being cut away to expose the clip.

Figure 2 is a sectional view of the clip and molding along the line 2—2 of Figure 3 with a portion of the molding flange cut away to expose the edge of the anchoring plate.

Figure 3 is a sectional view taken substantially along the line 3—3 of Figure 1, illustrating one form of improved clip structure.

Figure 4 is a perspective view of one modification of a retainer spring.

Figure 5 illustrates one modification of the invention which permits the ready attachment of corner moldings, the bolt assembly being shown in side elevation, with the clip molding and supporting surfaces shown in section.

Figure 6 is a perspective view of the end anchoring plate shown in Figure 5.

Figure 7 is a perspective view of the retainer spring illustrated in Figure 5.

Referring to the drawing, in Figures 1 and 2, 10 represents a hollow molding or trim strip provided with the usual inturned flanges 12 and 14 which is to be mounted on apertured support 16. Preparatory to assembly of the molding on the supporting surface 16, the formed anchoring plate 18 and the retainer spring 20, held in assembled position by a carriage bolt 22 or other suitable means, are inserted into the molding between the inwardly turned flanges 12 and 14. The anchoring plate 18 is turned clockwise, as shown in Figure 2, so as to engage the inturned flanges 12 and 14. The clip is then positioned with reference to the apertures in the supporting structure and applied to the supporting surface.

The retainer spring 20 may conveniently be made as a one-piece stamping, preferably of spring steel. The base 24 of the retainer spring is held against the anchoring plate by the carriage bolt 22, while the retainer-spring arms 26 and 28 exert pressure against the molding 10 after insertion of the clip into the molding, thereby maintaining the position of the clip in spaced relation within the molding. At the center of the retainer spring is a transverse slot or aperture 30, which contains the neck 31 of the carriage bolt 22 and which permits this bolt to slide substantially transversely to the molding when the anchoring plate is in one of its more fully assembled positions.

The arm ends 32 and 34 may be enlarged and shaped so as to form rounded surfaces for engagement with the inner surface of the molding. The exact form of the arm ends is, of course, governed by the general contour of the molding. In the form of retainer spring shown in Figures 1 to 4, inclusive, the arm ends 32 and 34 are so shaped as to positively engage an ornamental, longitudinal depression 36 in the molding surface. This arm end construction, which is best shown in Figures 3 and 4, is not necessarily required by the invention, however, but merely serves to illustrate one variation of it. The arm ends 32 and 34 could equally well be fashioned in the form shown by arm end 84 of Figure 7, so as to engage a molding surface which is convex outward at the points of engagement. The form shown in the drawing is of a construction which adequately functions with either type of molding surface.

The anchoring plate 18 is preferably a one-piece stamping of approximately rectangular form with two diagonally opposed ends curved so as to permit the ready insertion of the clip and its use in tapered moldings and moldings of various widths. The anchoring plate shown in Figures 1 to 3, inclusive, has a central wall 38 and edge flanges 40. As shown in Figure 2, the anchoring plate 18 contains a central slot 42 of rectangular shape which, when the anchoring plate is in its most fully assembled position, is transverse to the molding itself. The preferred arrangement of the anchoring plate slot, the retainer spring slot, and the carriage bolt, as shown in Figures 1, 2, and 5, is to have the width of the anchoring plate slot 42 approximately equal to the thickness of the carriage bolt neck, while the width of the retainer spring slot is sufficient to permit the carriage bolt and the anchoring plate to rotate with reference to the retainer spring. Rotation of the carriage bolt within the anchoring plate is prevented, and at the same time the formed lugs 43 on the carriage bolts hold the retainer spring and the anchoring plate firmly together. This arrangement could be reversed, of course, so as to have the retainer spring slot of greater width than the anchoring plate slot, depending upon the practicalities of forming the carriage bolt lugs 43 of sufficient size so as to insure retention of the carriage bolt within these two slots.

As shown in Figure 3, 44 represents a resilient washer with a cap 46, which helps prevent loosening of the nut 48 from the bolt 22.

Figure 5 illustrates a modification of the molding clip which is adapted for use in a corner-fitting molding, the hollow molding or trim strip 50, which is mounted on apertured support 52, possessing longitudinal curvature and the usual inturned flanges 53. The anchoring plates 54 and 56 are preferably one-piece stampings, 56 being of approximately rectangular form with two diagonally opposite ends curved to permit easy insertion of the clip into the molding and its use in tapered moldings and moldings of various widths. Anchoring plate 54 may be of the form shown in Figure 6 and is shaped so as to permit the ready insertion of the clip and engagement with the sharply tapered end of the molding. Anchoring plates 54 and 56 contain slots 58 and 60, respectively, which, when these members are in their most fully assembled positions, are transverse to the molding itself.

Preparatory to assembly of molding 50 on supporting surface 52, anchoring plates 54 and 56 and a retainer spring 62, held in assembled position by carriage bolts 64 and 66, respectively, or other suitable means, are inserted in the molding between the inturned flanges 53. The anchoring plate 56 is turned so as to engage the molding flanges. The clip is then positioned in spaced relation and applied to the supporting surface.

The retainer spring 62, which is separately shown in Figure 7, may be a one-piece stamping, preferably of spring steel. The bases 68 and 70 of the retainer spring are held against the anchoring plates 54 and 56, respectively, by the carriage bolts 64 and 66 or similar connecting members while the retainer spring arms 72, 74 and 76 exert pressure against the molding 50 after insertion of the clip into the molding, thereby maintaining the position of the clip in spaced relation within the molding. The base portions 68 and 70 of the retainer spring contain transverse slots 78 and 80 in which slide the carriage bolts 64 and 66, respectively, thus permitting these bolts to be adjusted transversely to the molding.

The spring arms 72, 74 and 76 are bent and shaped to form arm ends 82, 84 and 86 for engagement with the inner surface of the molding. In the form of retainer spring shown in Figures 5 and 7, the arm ends 82 and 86 are constructed to permit sharp points 88 and 90 to positively engage the inner surface of the molding 50. The arm end 84 shown in Figures 5 and 7 is of the curved or rounded type, its principal function being merely to aid in the exertion of pressure. The arm tips described and shown in Figures 5 and 7 are not necessarily required by the invention but merely indicate possible variations. The contour of the molding to be attached will be instrumental in determining the exact construction of these arm ends.

It will be understood that the term "molding" as used herein is not intended as a limitation to a specific use of the invention and that the clip is adapted generally for mounting articles having an internal surface into which the retainer springs may engage, and inwardly directed flanges or shoulders upon which the anchoring plates may seat.

I claim:

1. A clip for mounting a hollow molding having inturned flanges, said clip comprising an anchoring plate of approximately rectangular form with curved ends and a substantially centered slot; a retainer spring having adjacent to the anchoring plate a base portion with arms projecting outwardly from the plane of the base portion and adapted to bear against the inner surface of the molding face to cause the anchoring plate to assume a position inside the molding and engaging the molding flanges, the spring exerting pressure upon the molding and anchoring plate, thereby holding these members in spaced relation, said base portion having a substantially centered slot communicating with the said anchoring plate slot; and elongated fastening means having a polygonal cross section positioned in said slots for holding the retainer spring and anchoring plate together and for fastening the assembled clip and molding to a supporting surface, the widest cross sectional dimension of said means being wider than the width of one of said slots and narrower than the width of the other of said slots to permit relative rotation of said members and lateral adjustment of said means and members.

2. A clip for mounting a hollow molding having inturned flanges, said clip comprising an elongated anchoring plate insertable within the molding, said anchoring plate being of approximately rectangular form with curved ends and a substantially central slot, a retainer spring having a base portion abutting the anchoring plate and arms extending outwardly from the plane of said base portion adapted to project against the inner surface of the molding face for forcing the anchoring plate to engage the inner surfaces of the molding flanges, the spring being adapted to exert pressure upon the molding and anchoring plate to hold these members in assembled relation, said base portion having a substantially central slot communicating with the slot in said anchoring plate, and a bolt having a generally rectangular neck portion positioned in said slots for holding the retainer spring and anchoring plate together and for fastening the assembled clip and molding to a supporting surface, one of said slots having a width greater than the distance between diametrically opposite corners of the neck portion of the bolt and the other of said slots having a width less than the distance between said diametrically opposite corners of the neck portion of the bolt to permit said bolt to be slidable only in one of said slots and both slidable and rotatable in the other of said slots.

3. A clip for mounting a hollow molding having inturned flanges, said clip comprising an elongated anchoring plate insertable within the molding, said anchoring plate being of approximately rectangular form with curved ends and a substantially central slot, a retainer spring having a generally flat base portion abutting the anchoring plate and arms angularly extending outwardly from the plane of said base portion adapted to project against the inner surface of the molding face for forcing the anchoring plate to engage the inner surfaces of the molding flanges, the spring being adapted to exert pressure upon the anchoring plate and molding to maintain the spring and anchoring plate in assembled position, said base portion having a substantially central slot communicating with the slot in said anchoring plate, and a bolt having a generally square neck portion positioned in said slots for holding the retainer spring and anchoring plate together and for fastening the assembled clip and molding to a supporting surface, the slot in one of said members having a width greater than the distance between diametrically opposite corners of the neck of the bolt to permit said bolt to be both slidable and rotatable within the slot of said member, the slot in the other of said members having a width less than the distance between diametrically opposite corners of the neck of the bolt to permit said bolt to be slidable in the slot of said other member but not rotatable therein.

4. A clip for mounting a hollow molding having internal flanges, said clip comprising a generally rectangular elongated anchor plate having curved ends adapted to engage the inner surfaces of said flanges, a spring pressure member having a base portion seating on said anchor plate and provided with arms projecting outwardly from the plane of the base portion for engagement with the inner surface of the molding face, said base portion and said anchor plate each having a generally central elongated opening with substantially parallel sides, and securing means having a head and an adjacent neck portion of non-circular cross-section positioned in said openings, the greatest transverse dimension of said neck portion being larger than the width of one of said openings and smaller than the width of the other of said openings to provide for slidability of said neck portion in both openings and rotatability of said neck portion in only one of said openings.

ENGELBERT A. MEYER.

References Cited in the file of this patent
UNITED STATES PATENTS

| Number | Name | Date |
|---|---|---|
| 1,024,420 | Ross | Apr. 23, 1912 |
| 1,148,643 | Whittam | Aug. 3, 1915 |
| 1,577,292 | Obreiter | Mar. 16, 1926 |
| 1,694,580 | Carr | Dec. 11, 1928 |
| 1,811,262 | De Sana | June 23, 1931 |
| 2,166,889 | Churchill | July 18, 1939 |
| 2,278,627 | Wernig | Apr. 7, 1942 |
| 2,473,400 | Waara | June 14, 1949 |
| 2,515,895 | Poupitch | July 18, 1950 |
| 2,531,348 | Amesbury | Nov. 21, 1950 |
| 2,531,351 | Chruchill | Nov. 21, 1950 |